(12) United States Patent
Cerny et al.

(10) Patent No.: US 6,247,550 B1
(45) Date of Patent: Jun. 19, 2001

(54) CONTROLLER FOR A MOTOR VEHICLE SERVO-ASSISTED STEERING SYSTEM

(75) Inventors: Walter Cerny; Armin Lang; Jürgen Schüle, all of Schwäbisch Gmünd (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/242,446
(22) PCT Filed: Aug. 18, 1997
(86) PCT No.: PCT/EP97/04504
 § 371 Date: Feb. 17, 1999
 § 102(e) Date: Feb. 17, 1999
(87) PCT Pub. No.: WO98/07612
 PCT Pub. Date: Feb. 26, 1998

(30) Foreign Application Priority Data

Aug. 21, 1996 (DE) ............................................. 196 33 632

(51) Int. Cl.⁷ ................................. B62D 6/00; B62D 6/02
(52) U.S. Cl. .............................................. 180/443; 180/446
(58) Field of Search ................................ 180/443, 444, 180/446, 170, 175, 178, 447; 701/41, 42

(56) References Cited

U.S. PATENT DOCUMENTS

| | | | |
|---|---|---|---|
| 4,522,279 | * 6/1985 | Kanazawa | 180/143 |
| 5,299,650 | * 4/1994 | Wada et al. | 180/79.1 |
| 5,339,243 | * 8/1994 | Matsuoka et al. | 364/424.05 |
| 5,521,820 | * 5/1996 | Wakamatsu et al. | 364/424.05 |
| 5,913,913 | * 6/1999 | Okanoue et al. | 701/41 |
| 5,999,870 | * 12/1999 | Tatsumi et al. | 701/43 |

\* cited by examiner

Primary Examiner—Brian L. Johnson
Assistant Examiner—Tony Winner
(74) Attorney, Agent, or Firm—Larson & Taylor PLC

(57) ABSTRACT

In a power steering gear for motor vehicles, a control device (1) is used to control an adjusting element (6) for changing the steering characteristics as a function of the road speed of the motor vehicle. In the process, in addition to the road speed, the chronological change of the road speed, i.e. the acceleration and deceleration, is taken into account when controlling the adjusting element (6). A differentiation element (5) is arranged in the control device (1) parallel with an element (3) for detecting the road speed. Both the clement (3) for detecting the road speed as well as the differentiation element (5) supply their signals to a device (4) for signal processing.

15 Claims, 1 Drawing Sheet

CONTROLLER FOR A MOTOR VEHICLE SERVO-ASSISTED STEERING SYSTEM

FIELD OF THE INVENTION

The invention relates to a control device for a power steering gear for motor vehicles with an adjusting element for changing the steering characteristics, which can be controlled as a function of the road speed of the motor vehicle.

BACKGROUND OF THE INVENTION

A control device of this type is known from European Patent Publication EP 0 141 626 B1. With this control device, a defined electrical supply current, which is controlled as a function of the road speed, is provided to a solenoid of a proportional valve for changing the steering characteristics. In order to keep the power losses in the control device as low as possible, use is made of pulse width modulation, whose cycles are controlled by a generator. By means of their vibration effects, the voltage pulses generated in the process simultaneously can minimize the magnetic and mechanical friction losses in the magnetic circuit, if the cycle frequency has been selected to be correspondingly low. This means that the frictional losses in the magnetic cycle are very low when the cycle frequency is as low as possible. Therefore the selected frequency always must be a compromise and cannot offer an optimum solution for a requirement for less friction and low noise. In addition, delays occur in the control circuit between the detection of the road speed and the reaction which the driver notices at the steering wheel, which provide an inharmonious driving sense.

OBJECTS AND SUMMARY OF THE INVENTION

It is the object of the invention to provide a control device for a power steering gear which avoids the above mentioned disadvantages. In addition, it is intended to provide the driver with assured steering of his vehicle and with a harmonious driving sense, even during acceleration and braking of the vehicle.

This object is attained by means of the control device described herein below. The attainment takes place in that, in contrast to the known control device, not only the road speed, but also the chronological change of the road speed is taken into consideration when controlling the adjusting element.

Practical and advantageous embodiments of the invention are also recited herein below. Signals being generated on the basis of the road speed and the chronological changes of the road speed, i.e. from the acceleration, or respectively braking of the vehicle, are evaluated in a device for signal processing. A common signal for controlling the adjusting element is passed on from this device for signal processing. In the course of an acceleration process, a signal corresponding to a higher road speed is being generated, while in the course of a braking process a signal corresponding to a lower road speed is being generated. For example, when turning a tight corner, adjusting of the steering is prevented by means of this invention so that the driver is not surprised by a possibly sudden change of the steering characteristics.

A differentiation element is arranged in the control device parallel with an element for detecting the road speed. Both elements pass on their signals to the device for signal processing. Different possibilities for signal processing exist. For example, the device for signal processing can contain a characteristic diagram with different characteristic lines. Several characteristic line tables and acceleration tables can be stored in the characteristic diagram. Alternatively to this, the device for signal processing can process the signals from the differentiation element mathematically or analogously.

For example, the adjusting element can operate mechanically or electromechanically. However, it is advantageous if the adjusting element is the solenoid of a proportional valve, which can be electromagnetically operated, and if the supply current providing the proportional valve is controlled by a power transistor as a function of the road speed of the vehicle and of the chronological change of the road speed.

The invention will be explained in greater detail below by means of two exemplary embodiments represented in the drawings.

DETAILED DESCRIPTION OF THE PREFERRED EMBODIMENTS

Figure 1:
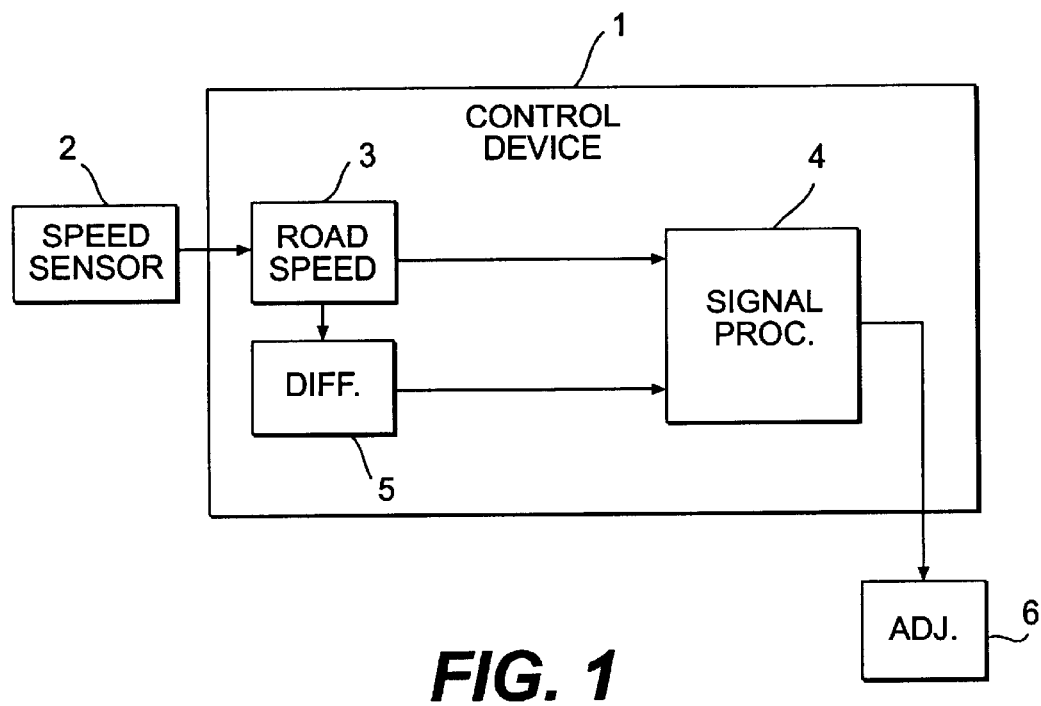
FIG. 1 shows the basic structure of the control device in accordance with the invention in a schematic representation.

Signals from a speed sensor 2 are supplied to a control device 1. Inside the control device 1, these signals are supplied to an element 3 for determining the road speed. On the one hand, this signal is passed on from this element to a device 4 for signal processing, and on the other hand to a differentiation element 5. A signal for the chronological change of the road speed is passed on from the differentiation element 5 also to the device 4 for signal processing. The signal decisive for the road speed as well as the signal decisive for the chronological change of the road speed are evaluated in the device 4 for signal processing. A signal for controlling an adjusting element 6 is generated in the device 4 for signal processing.

In this case, the device 4 for signal processing is designed in such a way that in the course of an acceleration process a signal is generated which corresponds to a higher road speed than the actual one, and in the course of a deceleration process a signal which corresponds to a lower road speed than the actual one.

A characteristic diagram with at least one is generated characteristic line table and at least one acceleration table can be contained in the device 4 for signal processing. Another possibility for signal processing can consist in that the device 4 for signal processing processes the signals from the differentiation element 5 mathematically or analogously.

Figure 2:
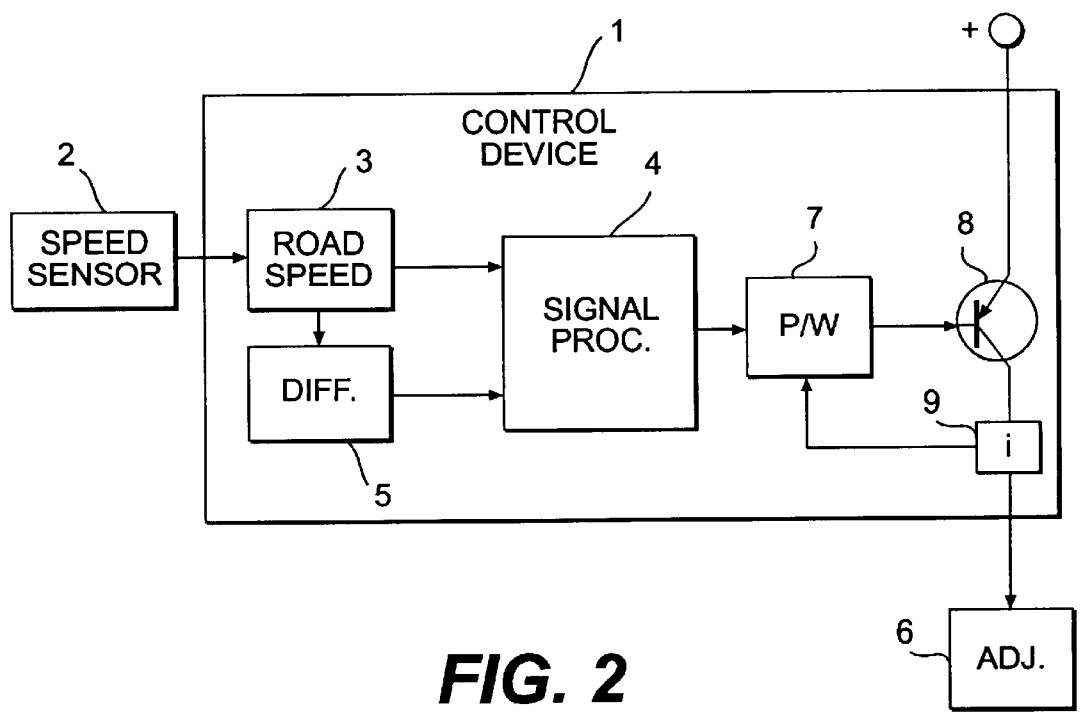
FIG. 2 represents an embodiment of the control device in FIG. 1.

The exemplary embodiment in FIG. 2 differs from the exemplary embodiment represented in FIG. 1 in that an end stage with a nominal/actual comparator, which contains a pulse width modulator 7, a power transistor 8 and a current sensor 9, is connected downstream of the device 4 for signal processing.

The adjusting element 6 is usefully designed as a solenoid of an electromagnetically operable proportional valve. The supply current provided the proportional valve is regulated by the power transistor 8 as a function of the road speed of the motor vehicle and of the chronological change of the road speed.

When the vehicle is driven at a defined speed, this speed is detected and evaluated, and the solenoid of the adjusting element 6 is supplied with current via the pulse width modulator 7 as a function of the characteristic driving line. If the vehicle is accelerated or decelerated, the chronological change of the speed is additionally detected and evaluated. The address of the characteristic line table of the device 4 for signal processing is changed in such a way that an override, so to speak, of the solenoid is caused. This override can be adapted to both the vehicle as well as the steering system with the aid of the steering system. It is possible in this way to compensate control delays in the system and hysteresis at the solenoid to a large extent.

What is claimed is:

1. A control device for a power steering gear for a motor vehicle which includes an adjusting element which changes steering characteristics of the steering gear, said control device comprising:

a speed means for controlling the adjusting element as a function of a road speed of the vehicle, said speed means including a speed element which produces a speed signal indicative of road speed;

a change means for additionally controlling the adjusting element as a function of a chronological change of the road speed, said change means including a change element which produces a change signal indicative of the chronological change of the road speed, and generating (a) a change signal higher than an actual road speed of the vehicle when an acceleration process occurs and (b) a change signal lower than an actual road speed of the vehicle when a deceleration process of the vehicle occurs; and a signal processor which evaluates the speed signal and the change signal and which generates a processor signal for controlling the adjusting element.

2. A control device as claimed in claim 1, wherein said change element is a differentiation element which receives said speed signal as an input.

3. A control device as claimed in claim 2, wherein said differentiation element includes a characteristic diagram.

4. A control device as claimed in claim 3, wherein said characteristic diagram contains at least one characteristic line and at least one acceleration table.

5. A control device as claimed in claim 3, wherein said processor processes the change signal of said differentiation element mathematically.

6. A control device as claimed in claim 3, wherein said processor processes the change signal of said differentiation element analogously.

7. A control device as claimed in claim 3;

wherein the adjusting element is a solenoid of an electromagnetically actuable proportional valve; and further including a power transistor which receives the processor signal from said processor and which controls a supply signal to the proportional valve as a function of the road speed of the vehicle and of the chronological change of the road speed.

8. A control device as claimed in claim 1;

wherein the adjusting element is a solenoid of an electromagnetically actuable proportional valve; and further including a power transistor which receives the processor signal from said processor and which controls a supply signal to the proportional valve as a function of the road speed of the vehicle and of the chronological change of the road speed.

9. A control device for a power steering gear for a motor vehicle which includes an adjusting element which changes steering characteristics of the steering gear, said control device comprising:

a speed means for controlling the adjusting element as a function of a road speed of the vehicle, said speed means including a speed element which produces a speed signal indicative of road speed;

a change means for additionally controlling the adjusting element as a function of a chronological change of the road speed, said change means including a change element which produces a change signal indicative of the chronological change of the road speed and which is a differentiation element which receives said speed signal as an input; and a signal processor which evaluates the speed signal and the change signal and which generates a processor signal for controlling the adjusting element.

10. A control device as claimed in claim 9, wherein said differentiation element includes a characteristic diagram.

11. A control device as claimed in claim 10, wherein said characteristic diagram contains at least one characteristic line and at least one acceleration table.

12. A control device as claimed in claim 10, wherein said processor processes the change signal of said differentiation element mathematically.

13. A control device as claimed in claim 10, wherein said processor processes the change signal of said differentiation element analogously.

14. A control device as claimed in claim 10;

wherein the adjusting element is a solenoid of an electromagnetically actuable proportional valve; and further including a power transistor which receives the processor signal from said processor and which controls a supply signal to the proportional valve as a function of the road speed of the vehicle and of the chronological change of the road speed.

15. A control device for a power steering gear for a motor vehicle which includes an adjusting element which changes steering characteristics of the steering gear, which adjusting element is a solenoid of an electromagnetically actuable proportional valve, said control device comprising:

a speed means for controlling the adjusting element as a function of a road speed of the vehicle, said speed means including a speed element which produces a speed signal indicative of road speed;

a change means for additionally controlling the adjusting element as a function of a chronological change of the road speed, said change means including a change element which produces a change signal indicative of the chronological change of the road speed;

a signal processor which evaluates the speed signal and the change signal and which generates a processor signal for controlling the adjusting element; and a power transistor which receives the processor signal from said processor and which controls a supply signal to the proportional valve as a function of the road speed of the vehicle and of the chronological change of the road speed.

* * * * *